Aug. 16, 1949.    L. A. POWELL    2,479,402
COWL FASTENER
Filed Sept. 28, 1942    2 Sheets-Sheet 1
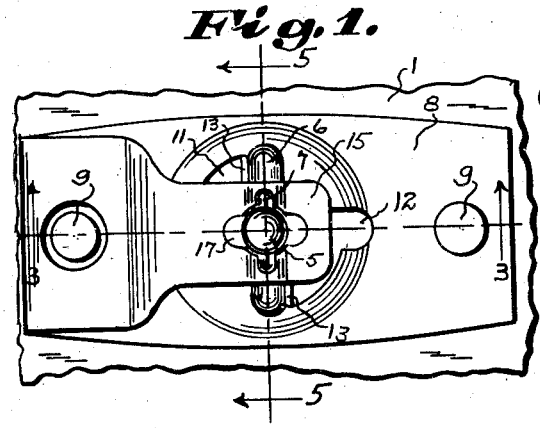
Fig. 1.
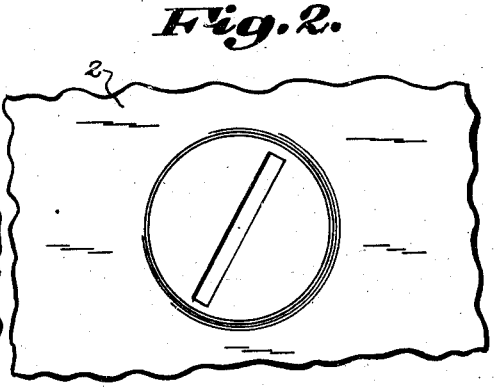
Fig. 2.
Fig. 3.
Fig. 4.
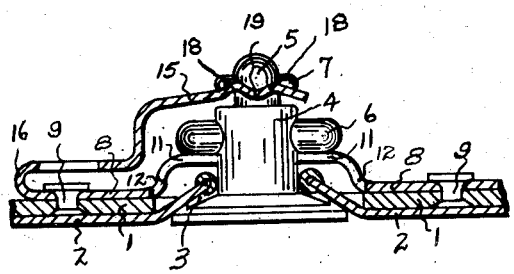
Fig. 5.
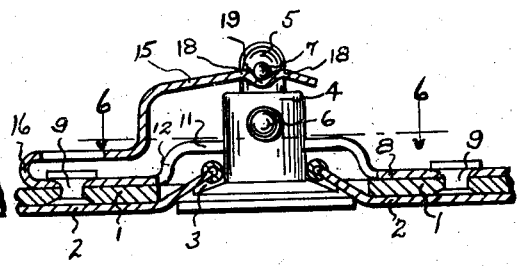
Fig. 6.
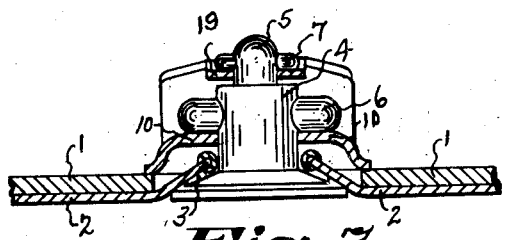
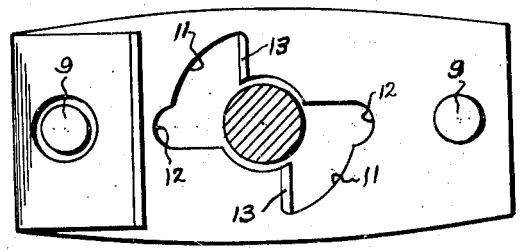
Fig. 7.
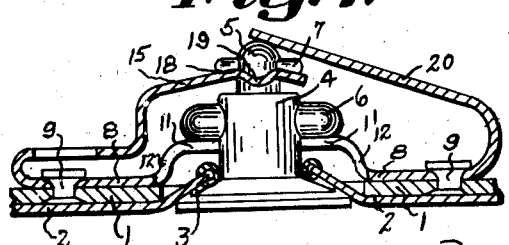
Inventor:
Leonard A. Powell.
By Walter S. Jones
Att'y.

Aug. 16, 1949.     L. A. POWELL     2,479,402
COWL FASTENER

Filed Sept. 28, 1942     2 Sheets-Sheet 2

Inventor:
Leonard A. Powell.
By Walter P. Jones Att'y.

Patented Aug. 16, 1949

2,479,402

UNITED STATES PATENT OFFICE 2,479,402

COWL FASTENER

Leonard A. Powell, Hyde Park, Mass., assignor to United-Carr Fastener Corporation, Cambridge, Mass., a corporation of Massachusetts Application September 28, 1942, Serial No. 459,896

2 Claims. (Cl. 24—221)

The present invention relates to rotary stud fasteners of the type commonly used for connecting airplane cowling sheets together and aims generally to simplifying and improving existing fasteners of that type.

Illustrative of the invention, reference is made to the accompanying drawings showing several preferred embodiments thereof, and in which Fig. 1 is a plan view of one form of fastener secured installation as viewed from the female fastener side;

Fig. 2 is a plan view thereof as viewed from the opposite or stud fastener side;

Fig. 3 is a longitudinal sectional view of the first form of fastener as taken on the line 3—3 of Fig. 1, but showing the stud fully inserted prior to being turned to locked position;

Fig. 4 is a similar view with the stud in its locked position;

Fig. 5 is a transverse sectional view taken on the line 5—5 of Fig. 1;

Fig. 6 is a horizontal sectional view as taken on the line 6—6 of Fig. 4;

Fig. 7 is a sectional view similar to Fig. 3 of a slightly modified form of the invention;

Figure 8:
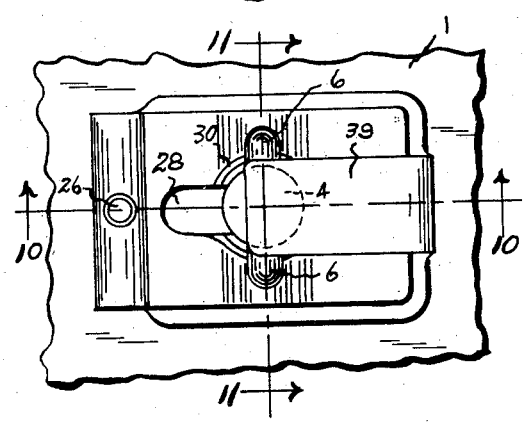
Fig. 8 is a plan view similar to Fig. 1 of the second form of fastener as viewed from the female fastener side.
Figure 9:
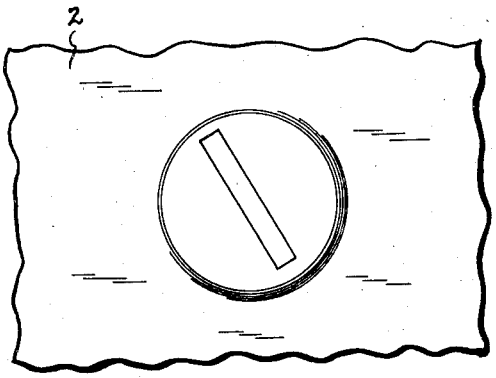
Fig. 9 is a plan view thereof as viewed from the stud fastener side.
Figure 10:
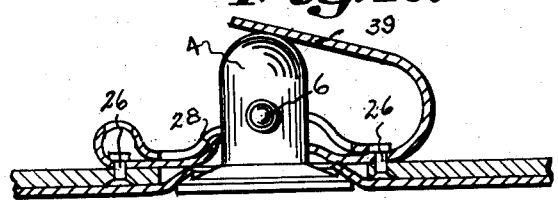
Fig. 10 is a longitudinal sectional view thereof as taken on the line 10—10 of Fig. 8.
Figure 11:
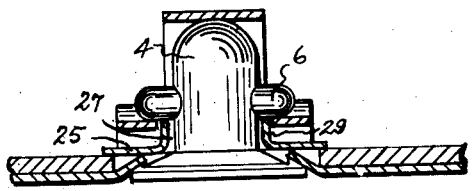
Fig. 11 is a transverse sectional view as taken on the line 11—11 of Fig. 8.
Figure 12:
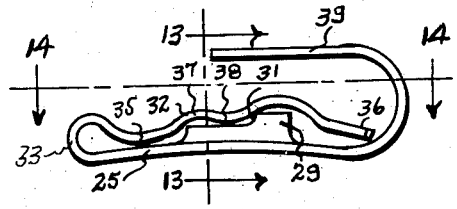
Fig. 12 is a side elevation of the female fastener member.
Figure 13:
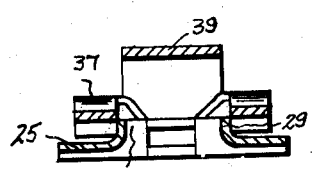
Fig. 13 is a transverse sectional view thereof as taken on the line 13—13 of Fig. 12.

The present invention provides new and efficient forms of female fastening members for cooperation with the usual rotary studs or pins having one or more sets of radial arms, and designed to lock against a relatively rigid portion of the female fastening member. Advantageously the invention includes means for automatically partially ejecting the stud when in unlocked position so that the unlocked condition of the fastener will readily be apparent to a workman or inspector. According to one form of the invention, additional means are provided for resiliently holding the parts of the installation in flush-tight locked position.

Referring more particularly to the form of invention shown in Figs. 1 to 6 inclusive, the improved fastener member is shown applied to a suitable support 1, which may be one of the cowling sheets of an airplane cowling, though it will be understood that the invention is not restricted to such use. The cooperating sheet 2, which is to be secured to the sheet 1 in flush-tight relationship, conveniently is apertured as at 3 in which is fitted a rotary stud or pin 4 having a head 5 exteriorly of the sheet and a pair of radial arms 6 and 7 interiorly of the sheet 2. Conveniently the sheet 2 is countersunk around the aperture 3 and the head 5 of the stud 4 is bevelled so that in locked position the outer face of the head will be flush with the outer face of the sheet 2. The head of the stud may be slotted or grooved for the reception of a bladed tool for rotating the stud, as is usual.

In order to fasten the sheets 1 and 2 securely together, the rotary stud or pin is adapted to cooperate and lock with a female fastener member attached to the rear face of the support or sheet 1, and preferably the female fastener is formed of an elongated strip of metal having a base portion 8 rigidly attached to the sheet 1, as by rivets 9. The central portion of the base is raised or spaced from the sheet 1 (see Figs. 3 to 7) to provide a pin arm receiving seat 10 which preferably is a rigid part or deformation. The raised portion of the base is provided with a central stud-receiving aperture 11, in registry with the aperture of the sheet 1, and said aperture 11 is preferably formed with radial elongations 12 to admit the passage of radial pin arms 6 and 7. The seat 10 preferably is further formed with stop means 13 spaced a desired distance from the elongations 12, as for example 90° therefrom, and advantageously these stop means are formed by outwardly bending portions cut from the raised portion, and serving to provide an abutment to limit rotation of the stud to a desired angular position.

The female fastener member preferably includes an integral spring arm 15 extended from one end of the base and connected thereto by a U-shaped bight portion 16 so as to overlie a portion of the base and the stud when the parts of the fastener are assembled. The portion of the spring arm 15, preferably an end portion thereof, is outwardly inclined and formed with an elongated opening 17 to receive the end of the stud 4 and radial pin arms 7, and this opening 17 is preferably in alignment with the aperture 10 and radial elongations 12 of the raised seat portion 10 of the base. The end of the spring, on opposite sides of the opening 17, is formed with spaced raised portions 18 and an intermediate pin-receiving seat 19 for the reception of the radial pin arms 7 when the stud is rotated to locked position.

When the stud 4 is applied to the female fastener member and rotated to locked position, as shown in Fig. 4, the interengaging spring arm and stud pin arms 7 provide supplemental resilient tension for holding the parts in assembled locked position as well as to provide a yieldable seat for the supplemental pin arms 7 tending to resist accidental rotation or unlocking of the stud, such as may be caused by vibration of the parts 1 and 2.

It will be understood that the base portion 8 of the female fastener may be attached to the support 1 in any suitable manner, and when it is desirable to rivet the base to the support in regions underlying an overlying spring arm, the spring arm may be apertured as at 19a, for the passage of the rivet and riveting tool.

According to one feature of the invention, it is desirable to provide means for automatically partially ejecting the stud when in unlocked position, so that the condition of the fastener will be readily apparent to the workman or inspector, merely by observation. This may be accomplished by providing a spring arm extension 20 connected to and extending from the base 8 and overlying the stud-receiving apertures outwardly of the base, as shown in Fig. 7. When the stud 4 is in locked position in the fastener as shown in Fig. 7, the spring arm 20 is under tension. When the stud is in unlocked position with the pin arms 6 and 7 aligned with the elongations of the openings 11 and 17 respectively, the spring 20 forces the stud inwardly, partially ejecting the stud, so that the head 5 is forced out of the countersunk recess in the sheet 2, thus providing an effective visual indication that the fastener is unlocked.

In the embodiments of the invention shown in the drawings, I have illustrated alternative ways of accomplishing the above stated advantages with rotary stud members having a single pair of radial pin arms 6.

Figure 14:
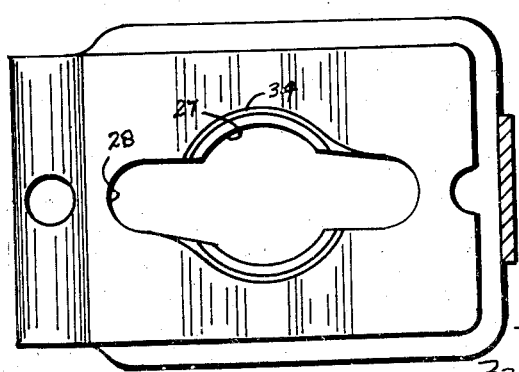
Fig. 14 is a horizontal sectional view thereof as taken on the line 14—14 of Fig. 12.

Referring to the form of fastener shown in Figs. 8 to 14 inclusive, the female fastener member comprises an elongated metal strip having a base portion 25 adapted to be secured to one face of the support 1 as by rivets 26, and provided with a stud-receiving aperture 27 having radial elongations 28 to admit the stud or pin and radial pin arms 6 (see Fig. 14). Marginal portions of the aperture 27 are flanged outwardly, as at 29, to form a rigid pin arm-receiving seat 30 to be engaged by the arms 6 upon rotation of the stud 4. The flanges 29 may be formed with raised portions 31 to serve as stop means to limit rotation of the stud to a predetermined angular position.

A spring member 32 overlies the base 25 and preferably this spring member is integral with the base being connected to one end portion thereof by a bight portion 33. The spring portion is formed with an aperture 34 of a size at least coextensive with the aperture 27 and elongations 28.

The spring member 32 is preferably bowed to provide spaced portions 35 and 36 having a sliding bearing on the base 25 and an intermediate arched pin arm-receiving portion 37 normally spaced above the seat 30 and adapted to be engaged and compressed by the arms 6 upon rotation of the stud to locked position, and thus provide a supplemental resilient tension on the stud to hold the parts 1 and 2 together. Preferably the arched portion of the spring is formed with a dished seat 38 disposed transversely of the aperture 34 to receive and hold the pin arms 6 against accidental rotation in locking direction.

The spring member 39 is preferably integrally connected to another portion of the base 25 and extends outwardly and rearwardly to a position overlying and bearing against the nose end of the stud 4, providing sufficient resilient tension to automatically partially eject the stud when in unlocked position.

Figure 15:
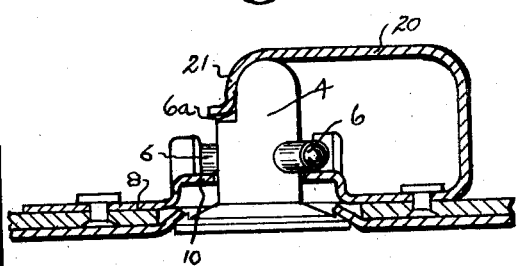
Fig. 15 is a longitudinal sectional view of a further modified form of fastener.

A further modified form of the invention for use with a stud having a single pair of radial arms 6 is illustrated in Fig. 15. In this form the base 8 and seat portion 10 of the female fastener may be like that illustrated in Figs. 1 to 7 inclusive. The stud ejecting spring arm 20 engages the end of the stud, as in Fig. 7, and is also formed with an inturned portion 21 engaging a flat or recessed face 6a of the nose end of the stud 4 which serves to resist accidental rotation of the stud to unlocking direction.

Although I have illustrated and described preferred embodiments of my invention, I do not wish to be limited thereby because the scope of my invention is best defined by the following claims.

I claim:

1. A cowling fastener of the rotary stud type for securing a support and a member to be attached thereto together, comprising a stud member rotatably mounted to the attaching member and provided with radially etxending pin arms, the end of said stud being provided with a rounded nose and a non-cylindrical side portion adjacent said nose, and a female fastening member comprising a metal strip having a base and an apertured raised pin arm-receiving portion adapted to receive and be engaged by said pin arms, and a spring member connected to said base and overlying the rounded nose end of said stud and engaging the non-cylindrical side portion thereof, for resisting turning movement of the stud when in locked position and partially ejecting said stud when in unlocked position.

2. A cowling fastener of the rotary stud type for securing a support and a member to be attached thereto together, comprising a stud member rotatably mounted on the attaching member and provided with radially extending pin arms, the end of said stud being provided with a rounded nose and a recessed flattened side portion adjacent said nose, and a female fastening member comprising a metal strip having a base and an apertured raised pin arm-receiving portion adapted to receive and be engaged by said pin arms, and a spring member connected to said base and overlying the rounded nose end of said stud and engaging the recessed flattened side portion thereof, for resisting turning movement of the stud when in locked position and partially ejecting said stud when in unlocked position.

LEONARD A. POWELL.

REFERENCES CITED

The following references are of record in the file of this patent:

UNITED STATES PATENTS

| Number | Name | Date |
| --- | --- | --- |
| 2,281,443 | Jones | Apr. 28, 1942 |